United States Patent
Takizawa et al.

(10) Patent No.: US 7,400,760 B2
(45) Date of Patent: *Jul. 15, 2008

(54) IMAGE PROCESSING APPARATUS

(75) Inventors: Katsutoshi Takizawa, Tokyo (JP); Hidetoshi Kumiya, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 670 days.

This patent is subject to a terminal disclaimer.

(21) Appl. No.: 10/845,980

(22) Filed: May 17, 2004

(65) Prior Publication Data

US 2004/0252880 A1 Dec. 16, 2004

(30) Foreign Application Priority Data

May 20, 2003 (JP) ............... 2003-142395

(51) Int. Cl.
*G06K 9/00* (2006.01)
*G06K 9/62* (2006.01)

(52) U.S. Cl. ...................... 382/153; 382/209

(58) Field of Classification Search ................ 382/209, 382/216, 190, 217, 291, 280, 153, 103, 282–283, 382/151
See application file for complete search history.

(56) References Cited

U.S. PATENT DOCUMENTS

| | | | |
|---|---|---|---|
| 5,809,171 A * | 9/1998 | Neff et al. ................. 382/209 |
| 5,943,442 A * | 8/1999 | Tanaka et al. ............. 382/216 |
| 6,088,483 A * | 7/2000 | Nakano et al. ............ 382/209 |
| 6,490,369 B1 * | 12/2002 | Beiman ..................... 382/153 |
| 6,690,841 B2 * | 2/2004 | Nguyen et al. ............ 382/294 |
| 6,766,055 B2 * | 7/2004 | Matsugu et al. .......... 382/173 |
| 6,771,808 B1 * | 8/2004 | Wallack .................... 382/151 |
| 6,807,286 B1 * | 10/2004 | Krumm et al. ............ 382/103 |
| 6,882,746 B1 * | 4/2005 | Naveen et al. ............ 382/173 |
| 6,975,755 B1 * | 12/2005 | Baumberg ................. 382/154 |
| 7,054,492 B2 * | 5/2006 | Lee et al. .................. 382/216 |
| 7,177,459 B1 * | 2/2007 | Watanabe et al. ......... 382/151 |
| 2002/0118875 A1 * | 8/2002 | Wilensky .................. 382/173 |

FOREIGN PATENT DOCUMENTS

EP 1 043 642 A2 10/2000

(Continued)

OTHER PUBLICATIONS

Nair et al, " Pattern matching based on a generalized Fourier transform", Proc. SPIE vol. 4116, p. 472-480, Advanced Signal Processing Algorithms, Architectures, and Implementations X, Publication Date: Nov. 2000 ☐☐.*

(Continued)

*Primary Examiner*—Andrew W. Johns
*Assistant Examiner*—Andrae Allison
(74) *Attorney, Agent, or Firm*—Staas & Halsey LLP (57) ABSTRACT

A first masking image of an input image is created by assuming that pixels in an area including the area of a target in all sample images are valid pixels while pixels in the remaining area are invalid pixels. The first masking image is used in a first comparison between the input image and each sample image to select an image that provides a best match as a provisionally selected sample image. In a second comparison, a second masking image corresponding to the provisionally selected sample image is used to select a final sample image. The second masking image is created from an individual sample image by assuming that pixels in an area including the area of the target are valid pixels while pixels in the remaining area invalid pixels.

5 Claims, 5 Drawing Sheets

FOREIGN PATENT DOCUMENTS

| | | |
|---|---|---|
| JP | 04-180183 | 6/1992 |
| JP | 07-021377 | 1/1995 |
| JP | 09-091425 | 4/1997 |
| JP | 09-237343 | 9/1997 |
| JP | 2000-288974 | 10/2000 |
| JP | 2001-021502 | 1/2001 |
| JP | 2003-030653 | 1/2003 |

OTHER PUBLICATIONS

Edwards et al, "Coarse-to-fine adaptive masks for appearance matching of occluded scenes", Machine Vision and Applications (1998) 10: 232-242.*

Bischof et al, "Recognizing Objects by Their Appearance Using Eigenimages", V. Hlav'ac, K. G. Jeffery, and J. Wiedermann (Eds.): SOFSEM 2000, LNCS 1963, pp. 245-265, 2000 Springer-Verlag Berlin Heidelberg 2000.*

Krumm, "Eigenfeatures for Planar Pose Measurement of Partially Occluded Objects", Proceedings of the 1996 Conference on Computer Vision and Pattern Recognition (CVPR '96) table of contents p. 55 Year of Publication: 1996 ISBN:0-8186-7258-7.*

Lougheed et al, "3-D Imaging Systems and High-Speed Processing for Robot Control", Machine Vision and Applications (1988) 1:41-57.*

Nair et al, "Pattern matching based on a generalized Fourier transform", Proc. SPIE vol. 4116, p. 472-480, Advanced Signal Processing Algorithms, Architectures, and Implementations X, Publication Date: Nov. 2000 ☐☐.*

Obdrz'alek et al, "Image Retrieval Using Local Compact DCT-Based Representation", DAGM'03, 25th Pattern Recognition Symposium Sep. 10-12, 2003, Magdeburg, Germany.*

Murase et al, "Detection of 3D objects in cluttered scenes using hierarchical eigenspace", Pattern Recognition Letters, vol. 18, No. 4, Apr. 1997, pp. 375-384(10).*

Hiroshi Murase, et al., "Detection of 3D objects in cluttered scenes using hierarchical eigenspace", Pattern Recognition Letters 18, pp. 375-384 (1997).

J.L. Edwards, et al., "Coarse-to-fine adaptive masks for appearance matching of occluded scenes", Machine Vision and Applications 10: pp. 232-242 (1998).

Michael Magee, et al., "An Industrial Model Based Computer Vision System", Journal of Manufacturing Systems, vol. 14, No. 3, pp. 169-186, (1995).

Aleš Leonardis, et al., "Robust Recognition Using Eigenimages", Computer Vision and Image Understanding 78, pp. 99-118 (2000).

Murase, Hiroshi, et al. "Detection of 3D objects in cluttered scenes using hierarchical eigenspace", *Pattern Recognition Letters 18*, vol. 14, No. 1, pp. 375-384, 1997.

Jeff Edwards, et al., "Appearance Matching of Occluded Objects Using Coarse-to-fine Adaptive Masks," Computer Vision and Pattern Recognition, IEE Computer Society, Jun. 1997, pp. 533-539.

Hiroshi Murase et al., "Image Spotting of 3D Objects Using Multi-Resolution and Eigenspace Representation," Transactions of Information Processing Society of Japan, vol. 36, No. 10, Oct. 1995, pp. 2234-2243.

Notice of Reasons for Rejection dated Jun. 13, 2006 of Application No. JP 2003-142395.

* cited by examiner

IMAGE PROCESSING APPARATUS

BACKGROUND OF THE INVENTION

1. Field of the Invention

The present invention relates to an image processing apparatus used for recognizing parts and other targets by using vision sensors and, more particularly, to an image processing apparatus that uses images to recognize the positions and orientations of targets that may be oriented in various directions.

2. Description of the Related Art

To enable a robot or another automatic machine to handle a target object that is not positioned precisely, such as a part, the target is imaged and its position, orientation, and so on are recognized from the resulting image data. This technique is used in many applications, but the wider the range of possible orientations of the target, the more difficult orientation recognition becomes. If the target faces in an arbitrary three-dimensional direction in a pile of parts, for example, its orientation is very difficult to recognize.

To address the above problem, Japanese Patent Application Laid-open No. 2000-288974 proposes a recognition method in which sample images of a target are captured from various directions in advance. The input image is compared with the sample images one by one to recognize the orientation of the target. The sample image providing the best match with the input image is selected and the orientation of the target is determined from the imaging direction of the selected sample image.

In this target orientation recognition method, the critical issue is to maximize the accuracy of the comparison. One of the factors lowering the comparison accuracy is a non-uniform background (non-target area) present in the input image used for recognition. When the sample images are obtained, the target is imaged under ideal conditions with a uniform background having uniform color and uniform brightness. At the site where the target is actually recognized, however, the background of the obtained input image includes unpredictable clutter such as objects other than the target to be recognized. A method of removing this interfering background is proposed by H. Murase and K. Nayar in 'Detection of 3D objects in cluttered scenes using hierarchical eigenspace', Pattern Recognition Letters 18, Vol. 14, No. 1, pp. 375-384, 1997. In this method, a window function is created as the product set of the area of a target of all the sample images and only the part of the image included in the window (product set) represented by the window function is used for comparison with the sample images.

As described above, one factor that lowers the sample image comparison accuracy is an irregular background coexisting with the target in the input image. If the comparison is carried out under conditions in which the effect of the background is removed, the recognition accuracy should improve, but the background removal method presented in the above reference is problematic in that the intersection window is often too narrow and the recognition accuracy may actually be worsened.

SUMMARY OF THE INVENTION

The present invention addresses the problem described above by creating a masking image with a window of appropriate size from the sample images and using it to mask interfering background to a certain extent before the comparison is made.

Specifically, the present invention provides an improved image processing apparatus of the type that selects an image captured in an imaging direction close to the imaging direction of a target included in an input image, from among a plurality of sample images obtained by imaging the target in a plurality of different directions. The improved image processing apparatus creates an appropriate masking image from the sample images, and masks out interfering background to a certain extent before comparing the input image with the sample images, thereby increasing the comparison accuracy. The present invention has the following three modes.

The image processing apparatus according to a first mode comprises means for creating a first masking image in which pixels in an area including an area of the target in all of the sample images are determined valid pixels while pixels in the remaining area are determined invalid pixels; and means for selecting an image providing a best match with the input image from among the sample images by comparing the input image with the sample images using the pixels of the input image corresponding to the valid pixels in the first masking image.

The image processing apparatus according to a second mode comprises means for creating, for each of the sample images, a second masking image in which pixels in an area including an area of the target in the respective sample images are determined valid pixels while pixels in the remaining area are determined invalid pixels; means for selecting an image providing a best match with the input image as a provisionally selected sample image from among the sample images, by comparing the input image with the sample images; and means for selecting an image providing a best match with the input image from among the sample images by comparing the input image with the sample images using the pixels of the input image corresponding to the valid pixels in the second masking image corresponding to the provisionally selected sample image with the sample images.

The image processing apparatus according to a third mode comprises means for creating a first masking image in which pixels in an area including an area of the target in all of the sample images are determined valid pixels while pixels in the remaining area are determined invalid pixels; means for creating, for each of the sample images, a second masking image in which pixels in an area including an area of the target in the respective sample images are determined valid pixels while pixels in the remaining area are determined invalid pixels; means for selecting, as a provisionally selected sample image, an image providing a best match with the input image from among the sample images by comparing the input image with the sample images using the pixels of the input image corresponding to the valid pixels in the first masking image; and means for selecting an image providing a best match with the input image from among the sample images by comparing the input image with the sample images using the pixels of the input image corresponding to the valid pixels in the second masking image corresponding to the provisionally selected sample image with the sample images.

In these modes, the comparison can be made between intermediate images obtained by applying an orthogonal transformation to the images to be compared. The orthogonal transformation may be a Fourier transformation or discrete cosine transformation. Components of the sample images obtained from an orthogonal transformation may also be principal components.

BRIEF DESCRIPTION OF THE DRAWINGS

The purposes and advantages of the present invention, including those described above, will be clarified by reference to the attached drawings in combination with the description of the embodiment presented below. Of these drawings.

DESCRIPTION OF THE EMBODIMENTS

Figure 1:
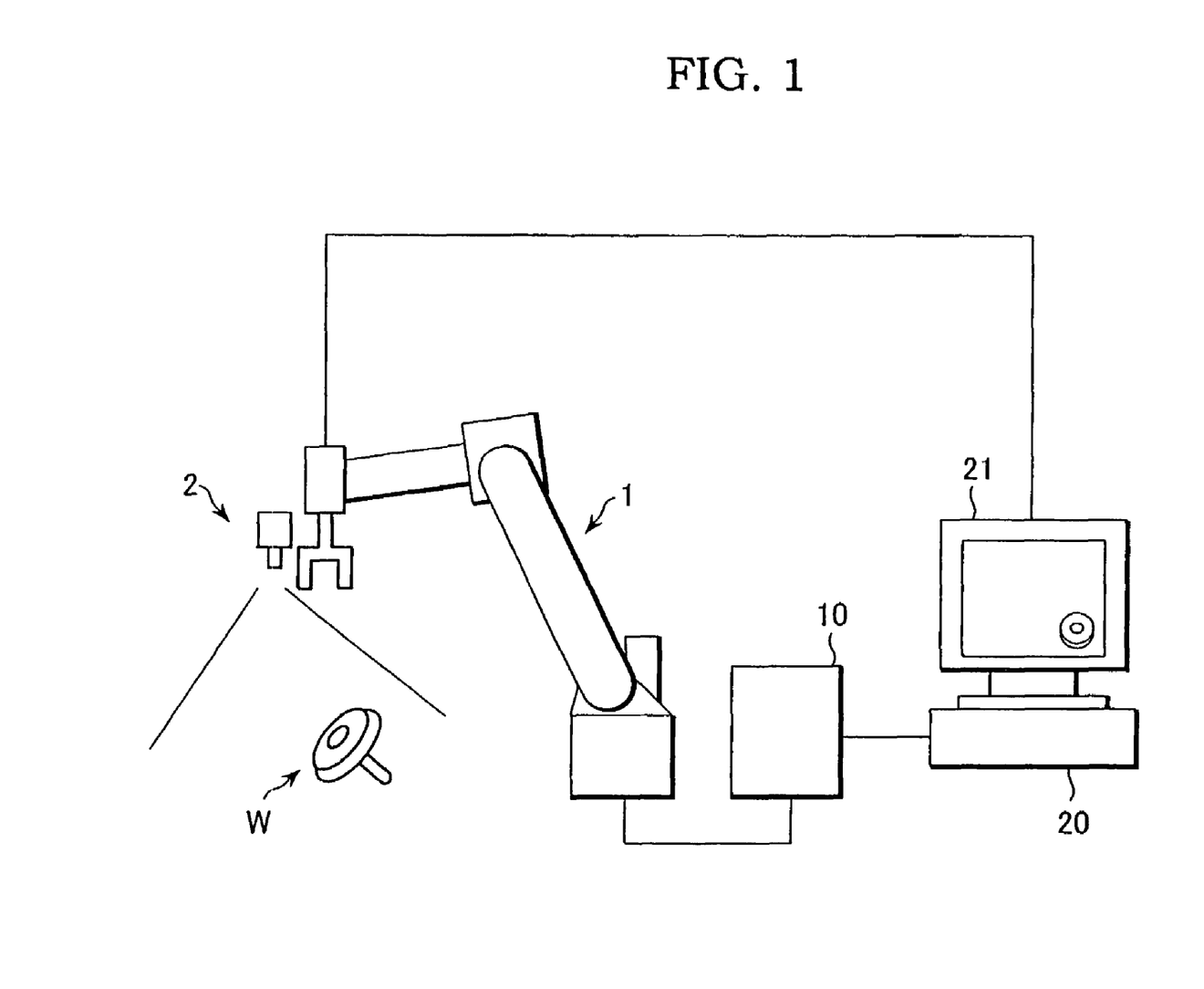
FIG. 1 schematically shows the configuration of a system including an image processing apparatus which embodies the present invention.

FIG. 1 schematically shows the configuration of a system including an image processing apparatus which embodies the present invention. In FIG. 1, reference numeral 1 indicates a robot (the mechanical part of the main body thereof). At the end of the arm of the robot 1, a camera 2 is attached as the imaging means of a vision sensor. The operation of the robot 1 is controlled by a robot controller 10 connected to the robot 1. The camera 2 is connected to an image processing apparatus 20, and the image processing apparatus 20 is further connected to the robot controller 10 through a communication line.

The image processing apparatus 20 has hardware, including a CPU, memory, camera interface, and communication interface, software that transmits and receives commands, image data, and the like to and from the camera 2 and robot controller 10, and software including a program and related parameters for carrying out image data processing in one of the modes described below. The image processing apparatus 20 is also equipped with a display 21 for displaying images captured by the camera 2, the corresponding processed images, and the sample images described below.

The robot controller 10 and image processing apparatus 20 include conventional manual operation means (not shown) such as a teaching pendant, keyboard, and mouse, enabling an operator to manually operate the robot, to manually enter, edit, start, and stop programs, to manually take pictures with the camera 2, to manually retrieve image data, and to manually enter, edit, start, and stop the image processing program, if necessary.

Upon reception of an imaging command or an image data output command from the image processing apparatus 20, the camera 2 captures an image including a target W (a part, for example) and supplies the resulting image data to the image processing apparatus 20. The image processing apparatus 20 uses the processing program to perform image processing in one of the modes described below and recognize the target. The robot controller 10 and image processing apparatus 20 have general functions for transmitting and receiving data as described in (1) to (3) below and performing related processing, maintaining mutual synchronization as necessary, (1) The robot controller 10 notifies the image processing apparatus 20 of the current position of the robot 1 at prescribed short intervals.

(2) The robot controller 10 issues an imaging command to the image processing apparatus 20 according to a program related to a work operation performed by the robot 1, such as grasping, or according to a command manually entered by the operator, to have the camera 2 capture an image and have the image processing apparatus 20 acquire image data.

(3) The target operating position of the robot 1, determined by the image processing apparatus 20, is sent to the robot controller 10.

From among the sample images obtained by imaging the target in a plurality of different directions, the sample image having the imaging direction most nearly matching the imaging direction of the target in the input image is selected. To improve this selection technique under the conditions described above, an appropriate masking image is first created from the sample images. Interfering background is deleted to a certain extent from the input image by masking it with the masking image, thus increasing the accuracy of the comparison between the input image and the sample images. The procedure will be described below.

The first step is to prepare a plurality of sample images by imaging an object of the same type as the target W in a plurality of different direction (an object of this type is referred to as a sample hereinafter). One exemplary method of obtaining sample images is to position an appropriately oriented sample in an appropriate place and take pictures of the sample with the camera 2 while changing the position and orientation of the robot. Sample image data is stored in a memory in the image processing apparatus 20. The robot positions are also stored in the memory of the image processing apparatus 20 in correspondence with the sample images. The robot may be moved to a plurality of different positions and oriented in a plurality of different directions according to operations taught in advance or selected manually by an operator.

When imaging is carried out to obtain sample images, interfering objects must be suppressed in the background of each sample by, for example, placing the sample on a plain floor having color and brightness differing from the sample. The sample may be one of the targets handled in actual operations, or a dummy similar to it in shape, size, and other properties.

Figure 2:
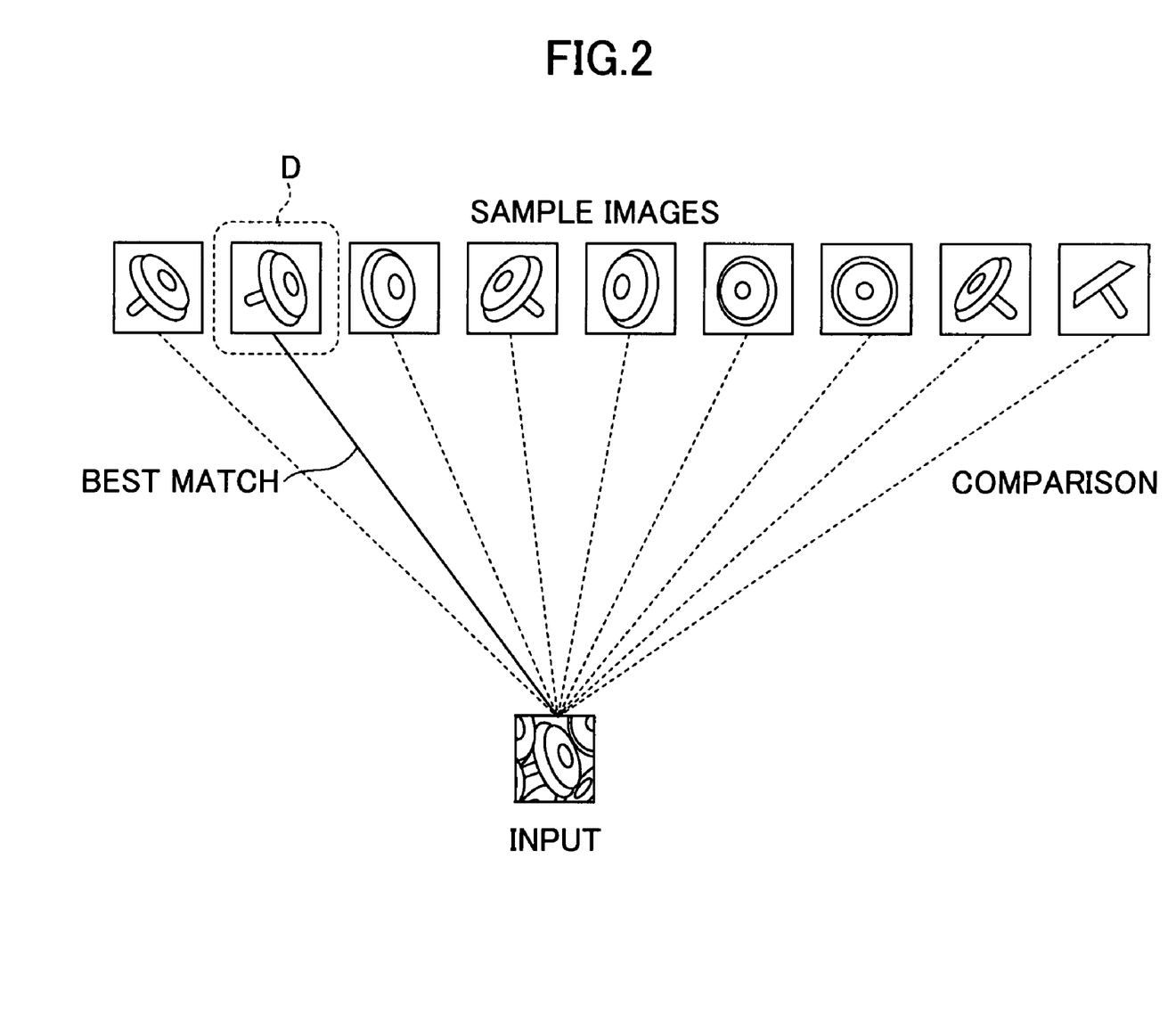
FIG. 2 illustrates comparisons between an input image and sample images obtained by the image processing apparatus in FIG. 1.

FIG. 2 shows exemplary sample images obtained as described above. When actual operations are performed using a system for which the sample images have been prepared, the robot 1 is positioned and oriented so that at least one target W (usually a plurality of identical targets are present) fits within the field of view; then an image is captured by the camera 2. An image (referred to as the input image hereinafter) consisting of an image of at least one target object and a background image is obtained and stored in the image processing apparatus 20. If the robot position for obtaining the input image (referred to as the input imaging robot position hereinafter) is taught in a program in advance, the robot can be moved to the input imaging robot position by reproducing the operation.

Data for identifying the input image is stored in the image processing apparatus 20 in relation to the input imaging robot position. FIG. 2 illustrates an exemplary input image thus obtained. The input image is compared with the plurality of already-prepared sample images, and the sample image found to show the target image in the direction closest to the imaging direction in which the input image was obtained is selected. In the example in FIG. 2, the sample image enclosed by dashed lines D is selected from among the plurality (group) of sample images.

The decision for the above selection (i.e., the imaging direction matching decision) is made in such a way that the sample image providing the best match with the input image is selected from among the sample images. A variety of techniques for determining whether an image provides a match are known. For example, images may be matched by correlating their brightness. Alternatively, an orthogonal transformation may be applied to the images to be compared and the degree of matching measured from distances between the resulting intermediate images. Available orthogonal transformations include the Fourier transformation and discrete cosine transformation, and a principal components analysis may be carried out by using components obtained by applying the orthogonal transformation to the sample images as their principal components. An orthogonal transformation can reduce the dimensional size of the data, as compared with direct correlation calculation between images, thus reducing the amount of calculation required for comparison of similar images. Orthogonal transformations and matching techniques are well known, so further details will be omitted.

As described above and as illustrated in FIG. 2, the input image includes both an image of the target to be recognized and a non-uniform background image. If the matching technique is used to compare the unaltered input image, including the background, with the sample images, or to compare intermediate images obtained by applying an orthogonal transformation to the input image and the sample images, therefore a correct result may not be obtained.

The present invention introduces the concept of using a masking image with a window of appropriate size, created from the sample images, to remove interfering background from the input image to a certain extent by masking before the comparison is made, as described above. Three masking modes are possible, corresponding to the three modes described earlier. These embodiments will be described below with reference to FIGS. 3 to 5.

Figure 3:
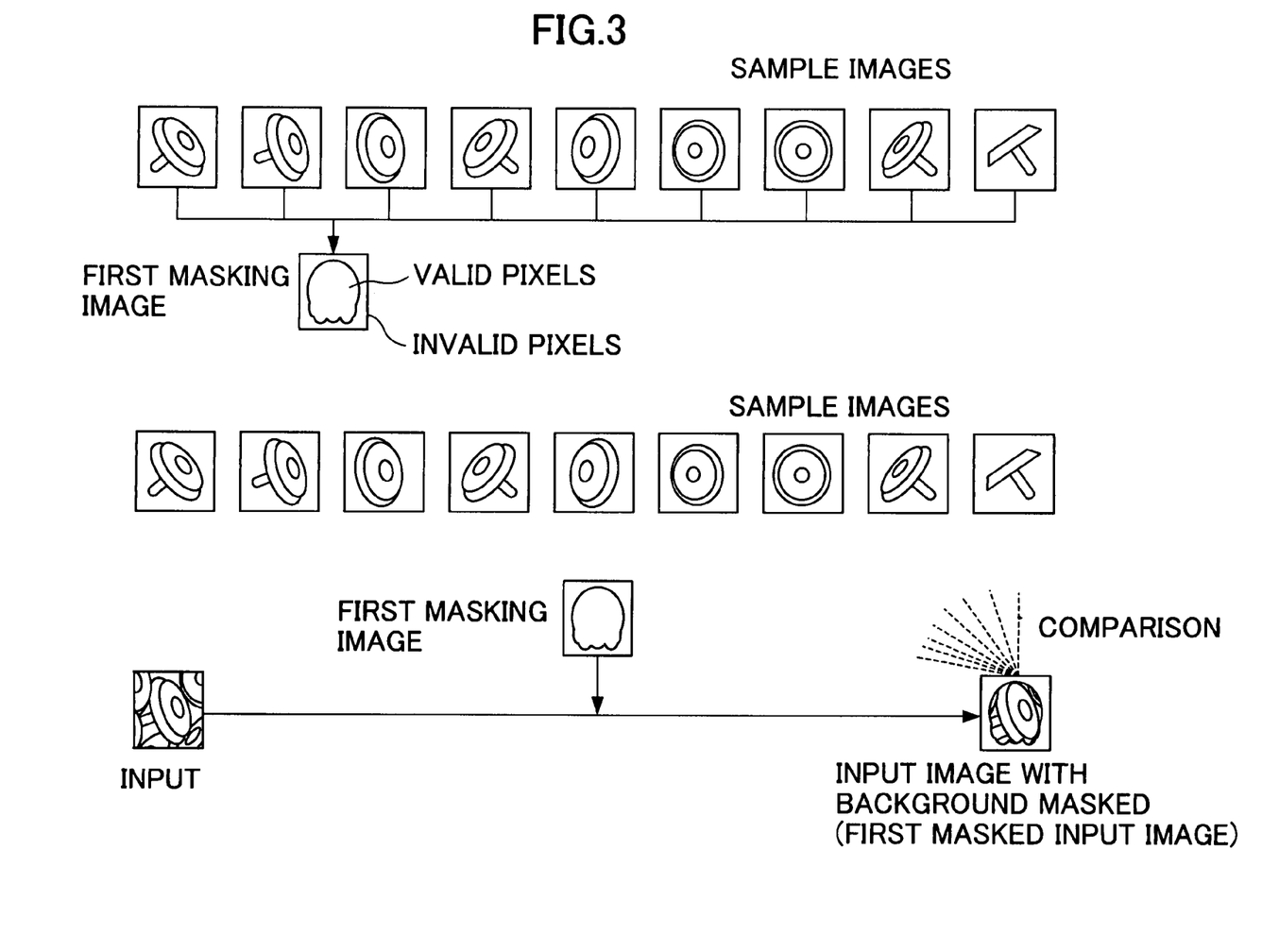
FIG. 3 illustrates comparisons in image-processing according to the first mode of the present invention.

First, FIG. 3 illustrates an image comparison processing in the first embodiment. A first masking image is created before the input image is compared with each sample image. The first masking image is created by assuming that pixels in an area covering the area of a target in all sample images are valid pixels while pixels in the remaining area are invalid pixels. This processing can be explained more specifically as follows:

Pixels in all sample images and the input image will be represented in common as Aij (i=1, 2, 3, ... m; j=1, 2, 3, ... n; the total number of pixels is m×n), and the s-th sample image will be denoted Ss (s=1, 2, 3 ... q; q is the total number of sample images). If a pixel Aij (i=1 to m, j=1 to n) is within an appropriate pixel area in which the target appears in at least one sample image Ss (s=1 to q), the image processing apparatus 20 determines pixel Aij as a valid pixel. Otherwise, pixel Aij becomes an invalid pixel, that is, if a pixel Aij is within an area in which the background appears in all the sample images S1 to Sq, the pixel Aij is determined invalid pixels.

Based on the result of this process, a masking process is then performed to correct the input image; only image data of the pixels determined to be valid pixels is retrieved from the input image to create a masked input image (referred to as a first masked input image hereinafter).

With the first masked input image, a substantial amount of irregular background clutter included in the input image is eliminated. Sample images S1, S2, . . . Sq are compared sequentially with the first to determine the sample image providing the best match. The comparison process can be performed by any of the well-known specific techniques described above. For example, matching based on correlation in brightness between images can be used. Another possible technique is to measure the degree of matching from distances between intermediate images obtained by applying an orthogonal transformation to the first masked input image and the individual sample images. Such orthogonal transformation may be Fourier transformation or discrete cosine transformation, or a transformation in which components obtained by applying the orthogonal transformation to the sample images is used as principal components.

When the sample image having the highest degree of matching (the sample image enclosed by dashed line D in the example in FIG. 2) is selected, the position and orientation of the target are calculated from the robot position at the time when the selected sample image was obtained and from the appearance of characteristic parts of the target. Two or more input images may be obtained by imaging the target in two or more different directions if necessary in order to calculate the position and orientation of the target. The masking process described above should then be applied to each of the input images for comparison with the sample images.

Figure 4:
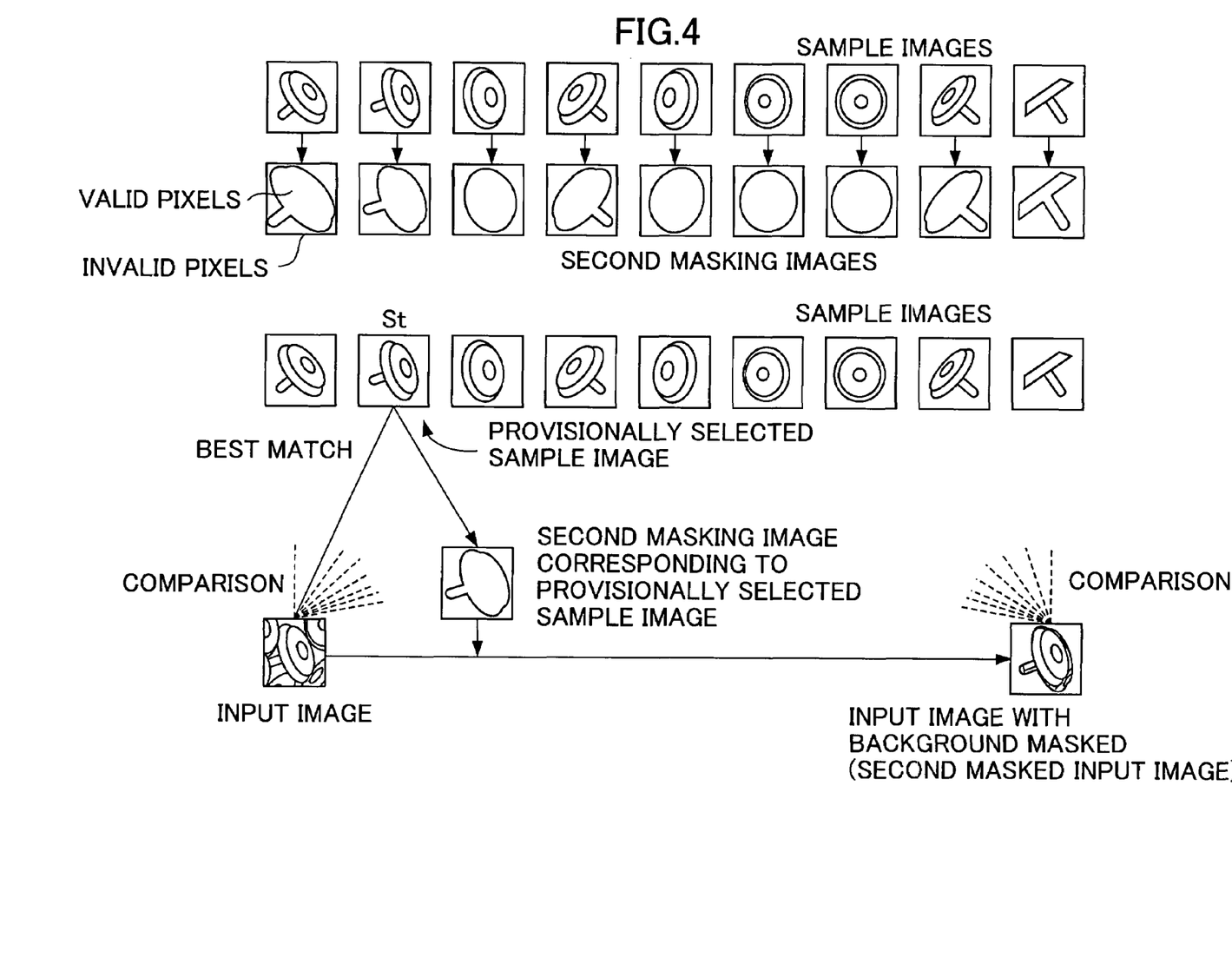
FIG. 4 illustrates comparisons in image processing according to the second mode of the present invention.

Next, FIG. 4 illustrates an image comparison process in the second embodiment. In this embodiment, two-stage comparisons are made between the input image and each sample image. The first stage comparison is carried out using all pixels in each image, and the sample image providing the best match with the input image is chosen as a provisionally selected sample image St.

In the second stage comparison, a second masking image created from the provisionally selected sample image St is used. The second masking image is created according to a rule slightly different from the first masking image: the second masking image is created for individual sample image. In the description below, the second masking image is created from the provisionally selected sample image St. For the provisionally selected sample image St, therefore, it is assumed that pixels in an area including the target are valid pixels and pixels in the remaining area are invalid pixels. The processing in the embodiment is described below using terms defined in the explanation of the first embodiment.

The image processing apparatus 20 performs a decision process for each pixel Aij in the provisionally selected sample image St: if a pixel Aij is within an appropriate pixel area including the pixel area in which the target is present in the provisionally selected sample image St, the pixel Aij is decided to be a valid pixel; if not (if the pixel Aij is within an appropriate pixel area including the pixel area in which the background is present in the sample image St), the pixel Aij is decided to be an invalid pixel. As a result, all the pixels in the provisionally selected sample image St are classified as valid or invalid.

Based on the result of this process, a further masking process is performed to correct the input image to create a second masked input image. With this process, substantial parts of the background are removed. The second masked input image is compared sequentially with all the sample images S1, S2, . . . Sq to determine the sample image providing the best match. If the provisional selection results in the best selection, the provisionally selected sample image St can be expected to become the final selection, but exceptions may occur. The processing for comparison and the processing to be carried out after the selection of the best matching sample image are the same as in the first embodiment, so further description will be omitted.

Figure 5:
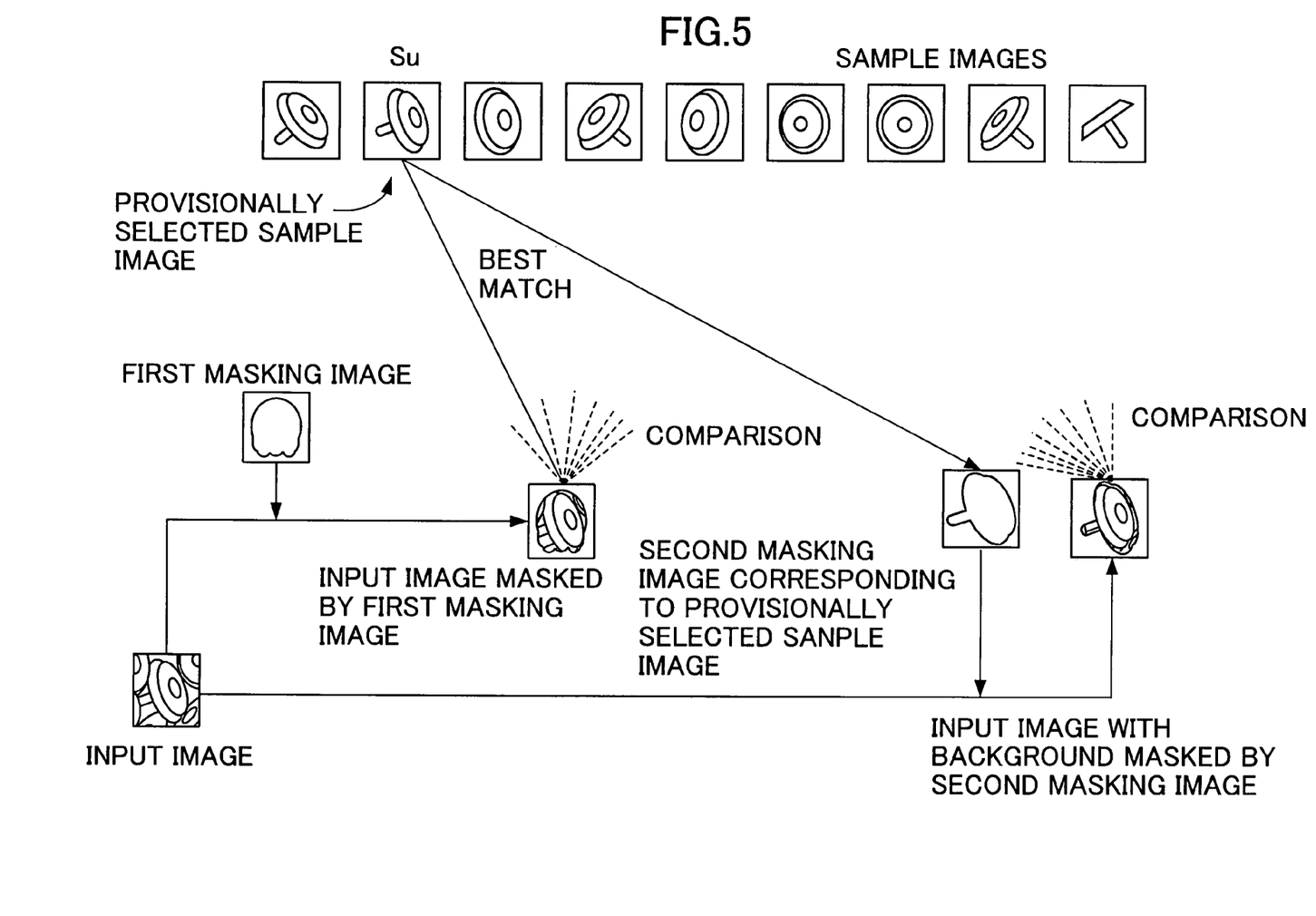
FIG. 5 illustrates comparisons in image processing according to the third mode of the present invention.

Finally, FIG. 5 illustrates the image comparison process in the third embodiment. In this embodiment, first and second masking images are created before the input image is compared with each sample image. The first masking image is created, as described above, by assuming that pixels in an area covering the area of a target in all sample images are valid pixels while pixels in the remaining area are invalid pixels. Further, a second masking image is created for each sample image by assuming that pixels in the area including the area of target are valid pixels while pixels in the remaining area are invalid pixels.

Comparisons between the input image and each sample image are carried out two times. In the first comparison, pixels corresponding to the valid pixels in the first masking image are used for comparison. With this comparison, an image providing the best match with the input image is chosen from among sample images as a provisionally selected sample image Su. The second comparison uses pixels corresponding to the valid pixels in the second masking image corresponding to the provisionally selected sample image Su.

The image processing apparatus 20 performs a decision process for each pixel Aij in the provisionally selected sample image Su: if a pixel Aij is within an appropriate pixel area including the pixel area in which the target is present in the provisionally selected sample image Su, the pixel Aij is decided to be a valid pixel; if not (if the pixel Aij is within an appropriate pixel area including the pixel area in which the background is present in the sample image Su), the pixel Aij is decided to be an invalid pixel. As a result, all the pixels in the provisionally selected sample image Su are classified as valid or invalid.

Based on the result of this process, a further masking process is performed to correct the input image to create a second masked input image. With this process, substantial parts of the background are removed. The second masked input image is compared sequentially with all the sample images S1, S2, ... Sq to determine the sample image providing the best match. If the provisional selection using the first masking image results in the best selection, the provisionally selected sample image Su can be expected to become the final selection, but exceptions may occur. The processing for comparison and the processes to be carried out after the selection of the best matching sample image are the same as in the first embodiment, so further description will be omitted.

The present invention improves accuracy and reliability in image selection by an image processing apparatus that selects an image captured in an imaging direction close to the imaging direction of the target included in an input image from among a plurality of sample images obtained by imaging an object of the same type as the target in a plurality of different directions.

The invention claimed is:

1. An image processing apparatus comprising:
    means for selecting an image captured in an imaging direction similar to an imaging direction of a target included in an input image, from among a plurality of sample images obtained by imaging an object of a same type as the target in a plurality of different directions, the sample images being stored in advance;
    means for creating a first masking image in which pixels in an area including an area of the target in all of the sample images are determined valid pixels while pixels in a remaining area of all of the sample images are determined invalid pixels to be masked;
    means for creating a plurality of second masking images corresponding to each of the sample images, in which pixels in an area including an area of the target in each of the sample images are determined valid pixels while pixels in a remaining area of each of the sample images are determined invalid pixels to be masked;
    means for selecting, as a provisionally selected sample image, a sample image providing a best match with the input image, from among the sample images, by comparing the input image with the sample images using the pixels of the input image corresponding to the valid pixels in the first masking image; and
    means for selecting an image providing a best match with the input image from among the sample images by comparing the input image with the sample images using the pixels of the input image corresponding to the valid pixels in the second masking image corresponding to the provisionally selected sample image.

2. The image processing apparatus according to claim 1, wherein the comparison is carried out between intermediate images obtained by applying an orthogonal transformation to the images to be compared.

3. The image processing apparatus according to claim 1, wherein the comparison is carried out between intermediate images obtained by applying a Fourier transformation to the images to be compared.

4. The image processing apparatus according to claim 1, wherein the comparison is carried out between intermediate images obtained by applying a discrete cosine transformation to the images to be compared.

5. The image processing apparatus according to claim 1, wherein the comparison is carried out between intermediate images obtained by applying an orthogonal transformation to the images to be compared, and wherein a group of components obtained by applying the orthogonal transformation to the sample images are treated as principal components of the sample image.

* * * * *

UNITED STATES PATENT AND TRADEMARK OFFICE
CERTIFICATE OF CORRECTION

PATENT NO.         : 7,400,760 B2
APPLICATION NO.    : 10/845980
DATED              : July 15, 2008
INVENTOR(S)        : Katsutoshi Takizawa et al.

It is certified that error appears in the above-identified patent and that said Letters Patent is hereby corrected as shown below:

Title Page, Column 2 (Abstract), Line 13, after "area" insert --are--.

Title Page 2, Column 1 (Other Publications), Line 5, change "V. Hlav'ac," to --V. Hlav'a'c,--.

Title Page 2, Column 2 (Other Publications), Lines 7-9, below "(10).*" delete "Hiroshi Murase, et al., "Detection of 3D objects in cluttered scenes using hierarchical eigenspace", Pattern Recognition Letters 18, pp. 375-384 (1997)." (Repeated Entry).

Title Page 2, Column 2 (Other Publications), Lines 10-12, below "(1997)." delete "J.L. Edwards, et al., "Coarse-to-fine adaptive masks for appearance matching of occluded scenes", Machine Vision and Applications 10: pp. 232-242 (1998)." (Repeated Entry).

Title Page 2, Column 2 (Other Publications), Line 29, below "No. JP 2003-142395" insert --Kohtaro al, "Detectability, uniqueness and reliability of eigen windows for stable verification of partially occluded objects," IEEE Transaction on Pattern Analysis and Machine Intelligence 19 (1997) 1043-1048.*--.

Sheet 5 of 5, FIG. 5, Line 14, change "SANPLE" to --SAMPLE--.
Delete Sheet 5 of 5 and substitute attached Sheet 5.

Column 4, Line 17, change "direction" to --directions--.

Column 5, Line 19, after "therefore" insert --,--.

Signed and Sealed this

Second Day of December, 2008

JON W. DUDAS
*Director of the United States Patent and Trademark Office*